Patented May 20, 1952

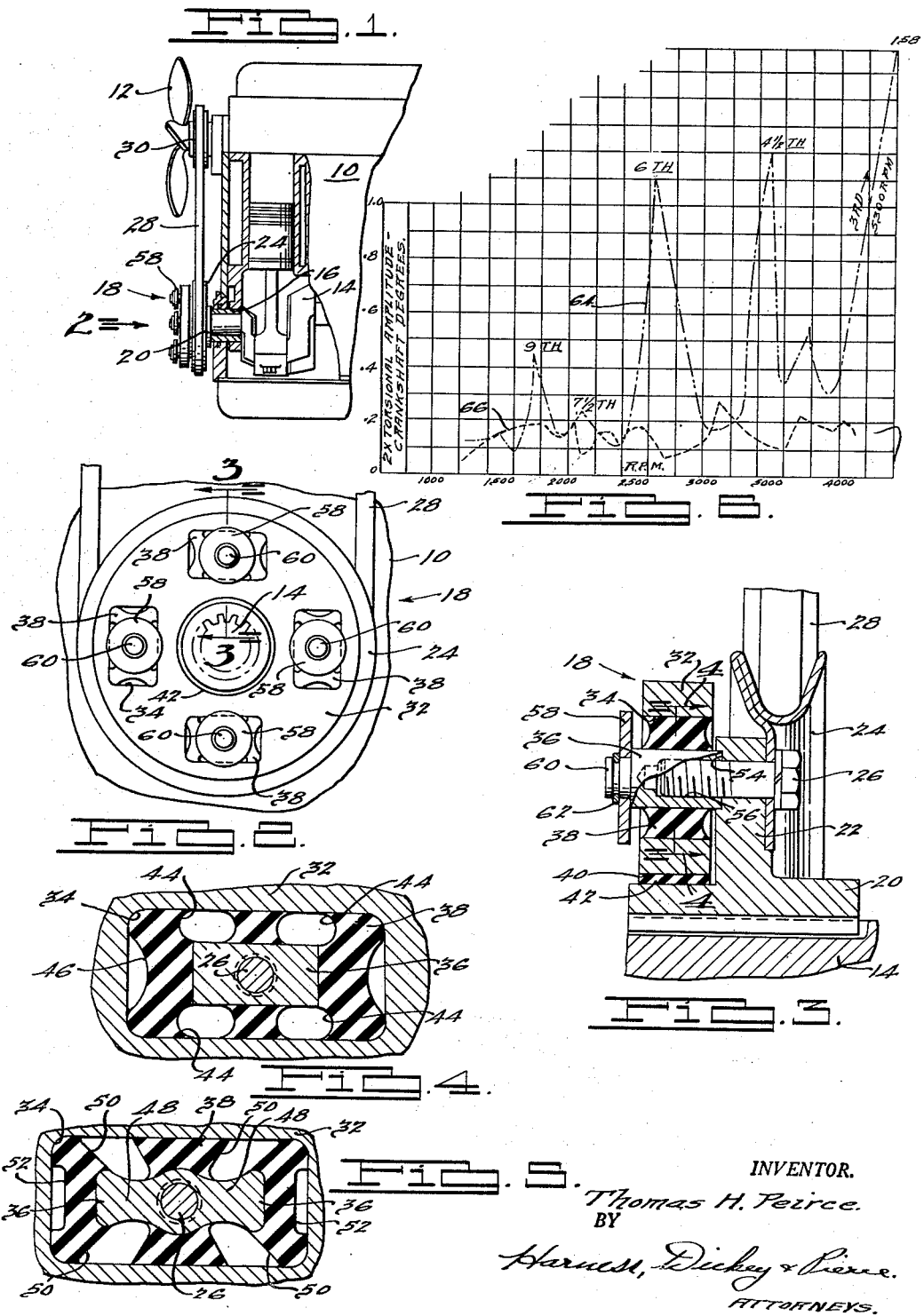

2,597,747

UNITED STATES PATENT OFFICE 2,597,747

VIBRATION DAMPER

Thomas H. Peirce, Detroit, Mich., assignor to H. A. King, doing business as H. A. King Company, Detroit, Mich.

Application February 25, 1948, Serial No. 10,772

10 Claims. (Cl. 74—574)

This invention relates broadly to new and useful improvements in vibration dampers, and more particularly to a tuned vibration damper assembly which is primarily adapted and pre-eminently suited for use on the crankshafts of internal combustion engines.

An important object of the present invention is to provide a vibration damper assembly which is tuned to vibrate at a frequency which is out of phase with the natural frequency of the engine system.

Another object of the invention is to provide a vibration damper of the above-mentioned character having an inertia member which is mounted to vibrate within a predetermined frequency range.

Still another object of the invention is to provide a vibration damper of the above mentioned character wherein the inertia member is mounted so that there is no metal-to-metal contact between it and any adjacent parts.

Yet another object of the invention is to provide a vibration damper of the above mentioned character wherein the inertia member is held by a plurality of inserts of rubber or the like, which inserts normally are under tension and are bonded to adjacent or associated parts.

A further object of the invention is to provide a vibration damper of the above mentioned character which is exceedingly effective to dampen the peak amplitudes of torsional vibration which normally occur in the crankshaft at predetermined engine speeds.

Other objects and advantages of the invention will be apparent during the course of the following description.

In the drawings forming a part of this specification, and wherein like numerals are employed to designate like parts throughout the same, Figure 1 is a side view showing parts in section and parts in elevation of a conventional internal combustion engine and illustrating a vibration damper embodying the present invention associated therewith;

Fig. 2 is an enlarged, fragmentary, front elevational view looking in the direction of the arrow 2 in Fig. 1 and particularly illustrating the manner in which the vibration damper is mounted on the crankshaft of the engine;

Fig. 3 is an enlarged, fragmentary, vertical, sectional view taken on the line 3—3 of Fig. 2;

Fig. 4 is a fragmentary, vertical, sectional view taken on the line 4—4 of Fig. 3;

Fig. 5 is a view similar to Fig. 4, but showing a modified mounting for the inertia member; and Fig. 6 is a graph illustrating the effect of a torsional vibration damper embodying the present invention on an internal combustion engine of conventional design.

In the drawings wherein for the purpose of illustration is shown a preferred embodiment of the invention, the numeral 10 designates an internal combustion engine having the usual fan 12 and crankshaft 14. Mounted on the forward end of the crankshaft 14 ahead of the front bearing 16 is a tuned vibration damper assembly 18 embodying the present invention.

In the form of the invention here shown by way of illustration, a hub 20 is splined on the crankshaft 14 forwardly of the front bearing 16 and the hub is provided with a radial flange 22 which carries the vibration damper assembly 18 and the usual V-pulley 24. As best shown in Fig. 3, the vibration damper assembly 18 and pulley 24 are mounted on opposite sides of the flange 22 and conveniently may be fastened to the flange by a common series of bolts 26. An endless belt 28 connects the pulley 24 with a pulley 30 in the usual manner to rotatably drive the fan 12.

The torsional vibration damper assembly shown in Figs. 2-4 comprises a generally disk-shaped inertia member 32 which has a plurality of essentially rectangular openings 34 disposed concentrically about the center of the disk. Generally rectangular mounting blocks 36 fastened to the flange 22 by bolts 26 are received within respective openings 34 and inserts 38 of flexible resilient material, such as rubber or the like, fit snugly within the openings 34 and around the mounting blocks 36. Also, it will be observed that the inertia member 32 is formed with a central opening 40 which surrounds and is spaced circumferentially from a portion of hub 20 extending forwardly of flange 22, and the opening 40 is provided with a liner 42 of flexible resilient material such as rubber or the like.

The rubber inserts 38 are bonded in any suitable manner to the inertia member 32 and also to the mounting blocks 36. When rubber is bonded to metal by conventional procedures, some shrinkage occurs in the rubber and this shrinkage places the rubber under tension after the molding operation is completed. The inertia member 32 is supported solely by the rubber inserts 38. Tensioning of the inserts 38 therefore is desirable in this instance since it permits the inertia member 32 to vibrate freely on the crankshaft 14 independently of the engine system. The result is a tuned damper assembly which is unexpectedly efficacious to dampen the peak loads of torsional vibration which occur in the crankshaft at certain predetermined speeds.

In order to permit the material of the rubber inserts 38 to flow under compression and to reduce stress concentrations, the inserts preferably are provided with openings 44 as best shown in Fig. 4. In the drawing, I have shown four generally oval openings 44 located substantially at the corners of each mounting block 36. Also, I have shown two openings 46 at opposite ends of each insert 38. All of the openings 44 and 46 extend entirely through the inserts. Openings 44 also extend radially across the inserts from the mounting blocks 36 to the inertia member 32. Openings 46, on the other hand, extend only part way across the inserts and open only against the inertia member 32.

In Fig. 5, I have shown a modified construction in which the mounting blocks 36 are still generally rectangular in form but are provided with relatively thin or reduced portions 48 adjacent the ends thereof. Also, elongated openings 50 replace the oval openings 44. In this connection, it will be observed that four openings 50 are provided and that they are located substantially in the same general manner as the openings 44. However, the openings 50 extend angularly outwardly from the reduced portions 48 of mounting blocks 36 so that the enlarged or bulbous ends of the blocks are entirely embedded in the inserts 38. The two end openings 52 here shown in each insert 38 differ somewhat from the openings 46 but they function in the same manner and serve the same purpose.

The liner 42 also is suitably bonded to the inertia member 32 and it snugly fits the hub 20. Thus, the liner 42 isolates the inertia member 32 from the hub and prevents metal-to-metal contact between the parts which results in galling and noise. In practice, the liner 42 merely serves as a pilot member when the tuned damper assembly is mounted on the hub 20 and it apparently has very little if any damping effect or restriction on the oscillating member.

From the above, it will be readily apparent that mounting blocks 36 are part of the damper assembly, and as best shown in Fig. 3, the mounting blocks project laterally of the inertia member 32 and inserts 38. When the damper assembly is mounted on the hub 20 as shown in the drawing, the projecting portions of mounting blocks 36 fit snugly in correspondingly shaped sockets 54 provided in the hub flange 22 and the sockets hold the mounting blocks fixed on the flange. Bolts 26 extend through registering openings in the flange 22 and pulley 24 and into internally threaded holes 56 provided in the adjacent ends of the mounting blocks 36. Retaining plates 58 fit over cylindrical shanks 60 on the outer ends of mounting blocks 36, and snap rings 62 hold the plates solidly against the outer ends of the blocks. Preferably, the retaining plates 58 overlap the inertia member 32 slightly, as perhaps best shown in Figs. 2 and 3, to limit lateral movement of the latter in the direction of the plates.

Attention is now directed to Fig. 6 which shows a typical dampening effect which a torsional vibration damper embodying the present invention has on a conventional internal combustion engine. A Continental engine was used for the test and the calculated natural period of torsional vibration of the engine system without the vibration damper was 265 cycles per second. When tested without the vibration damper the engine crankshaft had high amplitudes of torsional vibration at 1750 R. P. M., 2650 R. P. M., 3600 R. P. M., and 4400 R. P. M., as indicated by line 64.

When a tuned torsional vibration damper assembly embodying the present invention was mounted on the crankshaft of the engine, in the manner hereinabove described, the torsional vibration was greatly damped as shown by line 66. The tuned damper assembly used in this test had a natural frequency of 207 cycles per second and the kinetic energy of rotation of the inertia member was 40.9 lb. in.$^2$. The damper assembly had deflection of .066 measured at 10 in radius under 100 ft. lb. torque load. The damper tuning of 200 cycles per second was approximately 78% of the engine's natural frequency. It will be observed that, when the damper was installed, the torsional vibration in the crankshaft was not excessive at any time during the test.

It is to be understood that the forms of the invention herewith shown and described are to be taken as preferred examples of the same and that various changes in the size, shape and arrangement of parts may be resorted to without departing from the spirit of the invention or the scope of the appended claims.

Having thus described the invention, I claim:

1. A tuned type torsional vibration damper comprising a hub having a radial flange, an annular radially extending movable inertia member mounted on the hub adjacent said flange, said member having a plurality of rectangular openings extending axially therethrough, said openings being equi-angularly spaced and arranged so that the major dimension thereof is perpendicular to a radius through the center of the opening, substantially congruent rectangular connectors centrally located in said openings, said connectors having shanks extending axially out of opposite sides of the member, the shanks on one side of the member being fixedly connected to the flange whereby said connectors move with the hub, the shanks on the other side of the member having stop elements affixed thereto of greater radius than said openings whereby they are adapted to abut the side of the member to limit axial movement thereof relative to the flange, and rubber bodies in said openings bonded to said rectangular connectors and to the portions of the member defining said openings and in a state of tension, said rubber bodies serving to resiliently connect the inertia member to the hub flange through the medium of said connectors, said inertia member and said bodies being proportioned and arranged to have a predetermined frequency of torsional vibration.

2. The invention as set forth in claim 1 wherein said rubber bodies have axially extending apertures therethrough between the connector and member to provide space for the flow of rubber.

3. The invention is set forth in claim 2 wherein said apertures comprise two apertures in each of the two spaces defined by the facing major sides of a connector and opening and one aperture at least as wide as the minor side of the connector in each of the two spaces defined by the facing minor sides of a connector and opening.

4. A tuned type torsional vibration damper comprising a hub having a radial flange, an annular radially extending movable inertia member mounted on the hub adjacent said flange, said member having a plurality of rectangular openings extending axially therethrough, said openings being equi-angularly spaced and arranged so that the major dimension thereof is perpendicular to a radius through the center of the opening, substantially congruent rectangular connectors centrally located in said openings, said connectors having shanks extending axially out of opposite sides of the member, the shanks on one side of the member being fixedly connected to the flange whereby said connectors move with the hub, the shanks on the other side of the member having stop elements affixed thereto of greater radius than said openings whereby they are adapted to abut the side of the member to limit axial movement thereof relative to the flange, and rubber bodies in said openings in intimate, nonslipping engagement with said connectors and with the sides of said openings, said bodies having axially extending apertures therethrough, said inertia member and said bodies being proportioned and arranged to have a predetermined frequency of torsional vibration.

5. A torsional vibration damper comprising a hub adapted to be rotatably driven by a shaft, said hub having a flange extending radially to its axis of rotation, a plurality of angularly spaced mountings fixed to said flange and extending from a radial face of the flange in a direction parallel to said axis of rotation, an annular inertia member concentric with said axis and having openings therein receiving said mountings, the peripheries of said mountings within said inertia member being spaced from the walls of said openings, and rubber bodies in said openings surrounding said mountings and bonded to the peripheries of the mountings and to the walls of the openings so that the rubber bodies are stretched between said peripheries and walls whereby relative oscillation of said flange and member is resisted by additional stretching of said rubber bodies.

6. The invention set forth in claim 5 wherein said peripheries and walls are parallel to said axis of rotation whereby the weight of the inertia member is supported by stretching of said rubber bodies.

7. The invention set forth in claim 6 wherein said openings are substantially rectangular in shape with walls perpendicular to a radius from said axis of rotation whereby said relative oscillation is also resisted by shear of the rubber bodies.

8. A tuned type torsional vibration damper comprising a rotatably driven member, a plurality of fixed mountings on said driven member, an inertia member, and inserts of flexible resilient material fastening said inertia member to said mountings, said inertia member being mounted to oscillate freely on the driven member under the control of said inserts, said inserts being normally under tension and bonded to the inertia member and to the mountings, said inserts being each provided with a plurality of openings which allow the material of the insert to flow under compression, said inertia member and said inserts being proportioned and arranged to have a predetermined frequency of torsional vibration which is tuned to the natural frequency of torsional vibration of the driven member, said mountings being of generally rectangular shape and said inserts being positioned on and around said mountings, said inserts having openings located substantially at the corners of the mountings and extending entirely through the inserts and radially from the mountings to the inertia member.

9. A tuned type torsional vibration damper comprising a rotatably driven member, a plurality of fixed mountings on said driven member, an inertia member, and inserts of flexible resilient material fastening said inertia member to said mountings, said inertia member being mounted to oscillate freely on the driven member under the control of said inserts, said inserts being normally under tension and bonded to the inertia member and to the mountings, said inserts being each provided with a plurality of openings which allow the material of the insert to flow under compression, said inertia member and said inserts being proportioned and arranged to have a predetermined frequency of torsional vibration which is tuned to the natural frequency of torsional vibration of the driven member, said mountings being of generally rectangular shape and said inserts being positioned on and around said mountings, said inserts having openings located substantially at the corners of the mountings, certain of said openings extending entirely through the inserts and radially from the mountings to the inertia member, and other of said openings located at the ends of the inserts extending entirely through the latter and radially inwardly from the periphery thereof and part way therethrough.

10. A tuned type torsional vibration damper assembly comprising an inertia member having a plurality of openings therein, generally rectangular mounting elements in said openings, inserts of flexible resilient material fitting snugly in said openings and around said mounting elements, said inserts being normally under tension and bonded to the inertia member and to the mountings, each of said inserts having a plurality of openings which allow the material of the inserts to flow under compression, said inertia member and inserts being proportioned and arranged to have a predetermined natural frequency of torsional vibration, certain of said openings being located in the inserts substantially at the corners of the mounting elements and other of said openings being located at the ends of the inserts, said last mentioned openings extending only part way radially through the inserts and opening against said inertia member.

THOMAS H. PEIRCE.

REFERENCES CITED

The following references are of record in the file of this patent:

UNITED STATES PATENTS

| Number | Name | Date |
|---|---|---|
| 1,383,816 | Keller | July 5, 1921 |
| 1,778,503 | Lord | Oct. 14, 1930 |
| 1,820,750 | Lord | Aug. 25, 1931 |
| 1,924,269 | Brown | Aug. 29, 1933 |
| 2,049,133 | Peirce | July 28, 1936 |
| 2,115,427 | Olson | Apr. 26, 1938 |
| 2,153,914 | Christman | Apr. 11, 1939 |
| 2,157,158 | Blessing et al. | May 9, 1939 |
| 2,178,077 | Loftus | Oct. 31, 1939 |
| 2,198,135 | Strausburg et al. | Apr. 23, 1940 |
| 2,207,362 | Thorne | July 9, 1940 |
| 2,312,822 | Julien et al. | Mar. 2, 1943 |
| 2,367,709 | Arkus-Duntov et al. | Jan. 23, 1945 |
| 2,421,134 | Venditty | May 27, 1947 |